US009145097B2

(12) United States Patent  (10) Patent No.: US 9,145,097 B2
Beau et al.  (45) Date of Patent: Sep. 29, 2015

(54) TRIM ELEMENT COMPRISING A DECORATIVE ELEMENT AT LEAST PARTLY SURROUNDED BY A FILM IN PLASTIC MATERIAL

(71) Applicant: Faurecia Interieur Industrie, Nanterre (FR)

(72) Inventors: Godefroy Beau, La Garenne Colombes (FR); Eric Talleux, Saint Sulpice (FR); Nathalie Durand, Amberieu En Bugey (FR)

(73) Assignee: Faurecia Interieur Industrie, Nanterre (FR)

( * ) Notice: Subject to any disclaimer, the term of this patent is extended or adjusted under 35 U.S.C. 154(b) by 0 days.

(21) Appl. No.: 14/141,847

(22) Filed: Dec. 27, 2013

(65) Prior Publication Data
US 2014/0183892 A1 Jul. 3, 2014

(30) Foreign Application Priority Data
Dec. 27, 2012 (FR) ..................................... 12 62862

(51) Int. Cl.
*B60R 13/02* (2006.01)
*B29C 45/14* (2006.01)
*B32B 38/00* (2006.01)
(Continued)

(52) U.S. Cl.
CPC ........... *B60R 13/02* (2013.01); *B29C 45/14811* (2013.01); *B32B 1/00* (2013.01); *B32B 3/266* (2013.01); *B32B 21/04* (2013.01); *B32B 38/0012* (2013.01); *B60R 13/0262* (2013.01); B29C 2037/0042 (2013.01); B29L 2031/722 (2013.01); B32B 2255/08 (2013.01); B32B 2255/26 (2013.01); B32B 2307/71 (2013.01);
(Continued)

(58) Field of Classification Search
CPC .. B60R 13/02; B60R 13/0262; B60R 13/025; B60R 13/0256; B60R 13/0237; B60R 13/0243; B60R 2013/0293; B60R 2013/0287; B60R 2013/0281
USPC ..................................... 296/146.7, 1.08, 1.09
See application file for complete search history.

(56) References Cited

U.S. PATENT DOCUMENTS 4,779,390 A * 10/1988 Repper et al. .................... 52/222
5,462,786 A * 10/1995 Van Ert .......................... 428/171
(Continued)

FOREIGN PATENT DOCUMENTS

EP  0786380  7/1997
WO  WO2010/113626  10/2010

OTHER PUBLICATIONS

French Search Report for corresponding application No. FR 12 62862, dated Oct. 18, 2012, 2 pages.

*Primary Examiner* — Gregory Blankenship
(74) *Attorney, Agent, or Firm* — Reising Ethington P.C.

(57) ABSTRACT

The trim element (1) comprises at least one decorative element (6) made in a first material and comprising an external face forming a portion of the visible face of the trim element (1) and an internal face, said decorative element (6) being laid out on a film in plastic material (4), different from the first material, said film (6) comprising at least one underside area (16), extending over the internal face of the decorative element (6), said film being at least partly laid out on a substrate (2). The film (4) further comprises at least one peripheral area (18) extending around at least one portion of the decorative element (6) and forming another portion of the visible face of the trim element (1).

16 Claims, 5 Drawing Sheets

(51) Int. Cl.
  *B32B 21/04* (2006.01)
  *B32B 1/00* (2006.01)
  *B32B 3/26* (2006.01)
  *B29C 37/00* (2006.01)
  *B29L 31/00* (2006.01)

(56) References Cited

U.S. PATENT DOCUMENTS

| | | | |
|---|---|---|---|
| 7,070,221 B2* | 7/2006 | Cowelchuk et al. | 296/39.1 |
| 7,806,450 B2* | 10/2010 | Johnson et al. | 296/1.08 |
| 7,842,360 B2* | 11/2010 | Peters et al. | 428/31 |
| 7,963,586 B2* | 6/2011 | Muller et al. | 296/146.7 |
| 8,071,002 B2* | 12/2011 | Boyer | 264/259 |
| 8,506,003 B2* | 8/2013 | Smith et al. | 296/146.7 |
| 8,727,411 B2* | 5/2014 | Myszkowski | 296/1.06 |
| 8,733,811 B2* | 5/2014 | Evans et al. | 296/1.08 |
| 2009/0058118 A1* | 3/2009 | Hein et al. | 296/1.08 |
| 2014/0077530 A1* | 3/2014 | Preisler et al. | 296/193.07 |
| 2014/0183892 A1* | 7/2014 | Beau et al. | 296/1.08 |

* cited by examiner

TRIM ELEMENT COMPRISING A DECORATIVE ELEMENT AT LEAST PARTLY SURROUNDED BY A FILM IN PLASTIC MATERIAL

TECHNICAL FIELD

The present invention relates to a vehicle trim element of the type comprising at least one decorative element in a first material, said decorative element comprising an external face forming a portion of the visible face of the trim element and an internal face, said decorative element being laid out on a film in plastic material, different from the first material, said film comprising at least one underside area, extending on the internal face of the decorative element, said film being at least partly laid out on a substrate.

The present invention also relates to a method for making such a trim element.

BACKGROUND

Producing trim elements is known, in particular door panels, dashboard or other trims, comprising a decorative element having a particular aspect, for example a medallion, a decorative beading, or a decorative plate.

Such trim elements are generally made by injection of the substrate, or of the supporting element, on the underside of the decorative element in an injection cavity. However, the application of such a method is complicated since it is necessary to accurately position the decorative element in the injection cavity and immobilize it in order to obtain a trim element with a decorative element positioned in the intended location. The positioning and the holding of a decorative element in a specific location of the injection cavity are complex operations when they are repeated for producing several identical trim elements. These operations are even more complicated when two distinct decorative elements spaced apart from each other are provided on a trim element.

Further, there may be appearance defects in the transition area between the decorative element and the substrate surrounding the decorative element and forming a portion of the visible face of the trim element. Such defects may also be present when the decorative element is pierced and seeping of the injected material for forming the substrate through the aperture formed by the decorative element should be avoided.

SUMMARY

One of the objects of the invention is to overcome these drawbacks by proposing a trim element comprising a decorative element which may be made identical with the original in a simple way and without generating any defects in appearance.

For this purpose, the invention relates to a trim element of the aforementioned type, in which the film further comprises at least one peripheral area extending around at least one portion of the decorative element and forming another portion of the visible face of the trim element.

The presence of the peripheral area of the plastic film gives the possibility of improving the appearance of the transition between the decorative element and the remainder of the trim element on the side of the visible face of the trim element. Further, this peripheral area may be used for accurately positioning and holding the decorative element in an injection cavity. Thus, the trim element may be reproduced identically in a simple way and while guaranteeing the absence of defects in appearance on its visible face.

According to other features of the trim element according to the invention:

- the decorative element is formed with a wood complex, comprising at least one wooden material layer and a reinforcement layer, said reinforcement layer extending over the underside of the wooden material layer and forming the internal face of the decorative element;
- the peripheral area of the film substantially extends in the continuity of the external face of the decorative element;
- the decorative element comprises at least one aperture through said element, a peripheral area of the film extending in said aperture and forming the visible face of the trim element in said aperture;
- the peripheral area of the film extending in the aperture obturates said aperture or only covers the edges of said aperture;
- the trim element comprises at least two distinct decorative elements spaced apart from each other, the film comprising two underside areas, each extending over the internal face of one of the decorative elements, and at least one peripheral area extending from one decorative element to the other and forming the visible face of the trim element between said decorative element; and
- at least one peripheral portion of the film is subjected to a surface treatment so as to modify its appearance.

The invention also relates to a method for making a trim element as described above, this method comprising the following steps:

- placing at least one decorative element on a wall of a forming tool, the external face of said element being applied against said wall,
- applying the underside area of the film in plastic material on the internal face of the decorative element and the peripheral area against the wall of the forming tool so that said area surrounds at least one portion of the decorative element, said film being attached to the decorative element during this operation,
- forming the substrate on the internal face of the film in plastic material, on the face of said film opposite to the underside area and to the peripheral area.

According to other features of the manufacturing method according to the invention:

- at least two decorative elements are placed on the wall of the forming tool spaced apart from each other, the film being applied on the internal faces of said two decorative elements and the peripheral area of said film being applied against said wall at least between said decorative elements;
- the decorative element/plastic material film assembly is placed in an injection tool after assembling the decorative element and the film, the substrate being injected on said film in said injection tool.

BRIEF DESCRIPTION OF THE DRAWINGS

Other aspects and advantages of the invention will become apparent upon reading the description which follows, given as an example and made with reference to the appended drawings, wherein.

DESCRIPTION OF THE ILLUSTRATED EMBODIMENTS

In the description, the terms of "internal" and "external" are defined relatively to the orientation of the trim element when it is positioned in a vehicle, the term of "internal" designating what is intended to be turned towards the body of the vehicle and not visible to the occupants of the vehicle and the term of "external" designating what is intended to be turned towards the inside of the passenger compartment of the vehicle. The term of "upside" designates the side of an element turned outwards and the term of "underside" designates the side of an element turned inwards.

Figure 1:
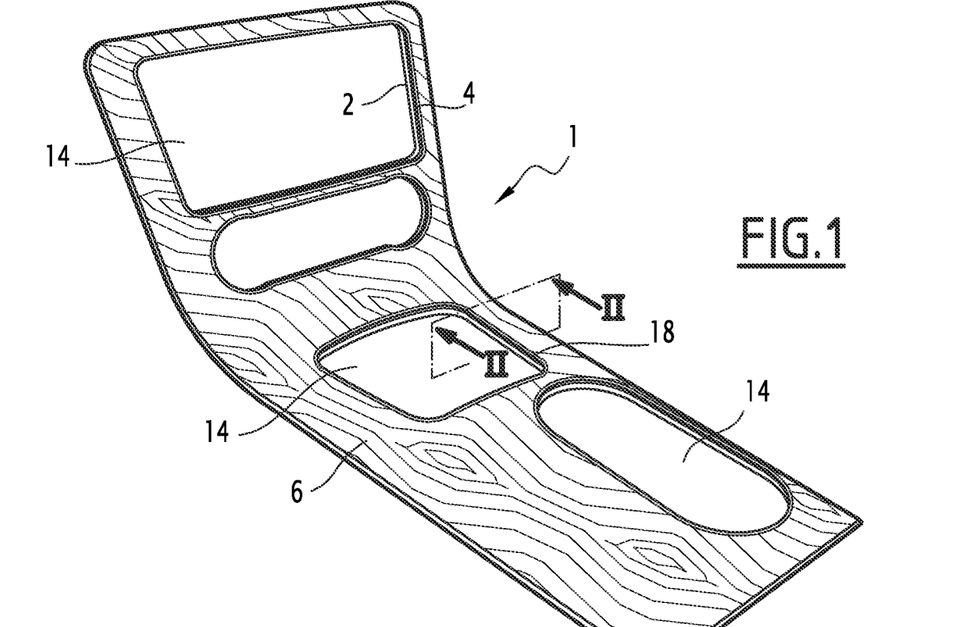
FIG. 1 is a schematic perspective illustration of a trim element example according to the invention.
Figure 2:
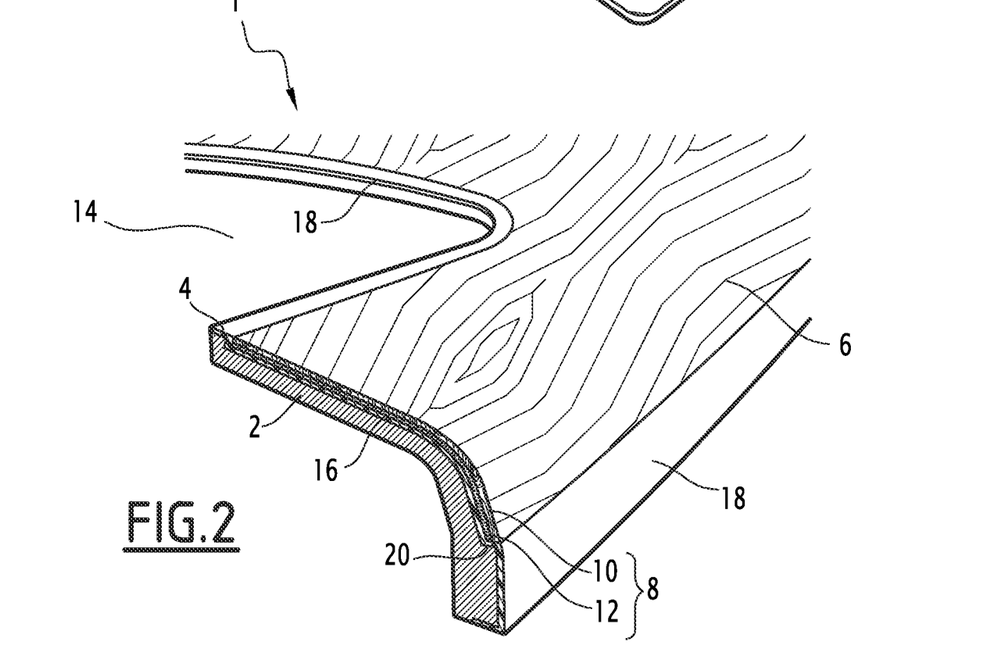
FIG. 2 is a schematic perspective and sectional view illustration of the trim element of FIG. 1, the section having been made along the plane II-II of FIG. 1.
Figure 3:
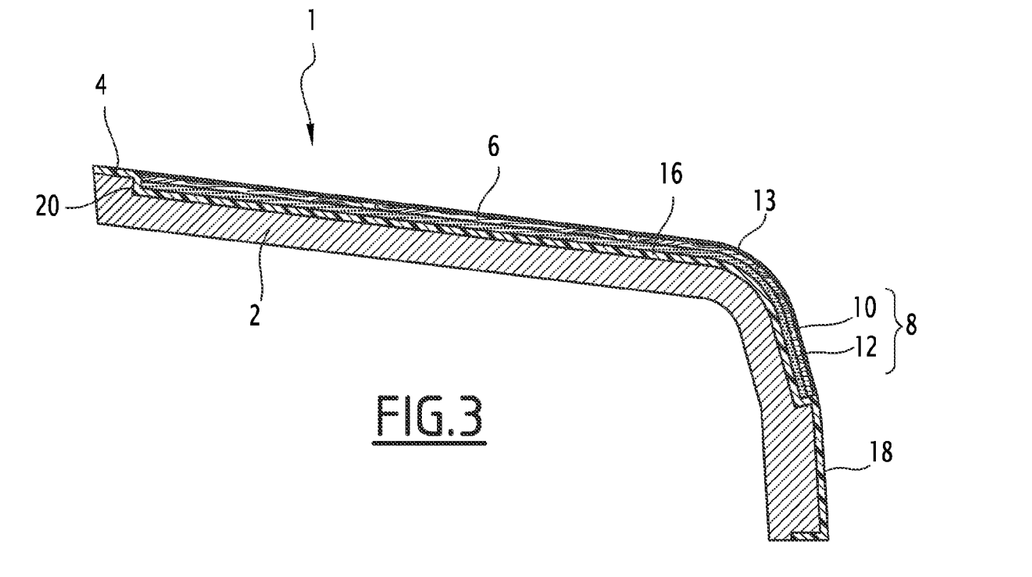
FIG. 3 is a schematic sectional view illustration of the trim element along the plane II-II of FIG. 1.

With reference to FIGS. 1 to 3, a trim element 1 is described, comprising from the inside to the outside, a substrate 2 or supporting element, a film in plastic material 4, partly or totally covering the external surface of the substrate 2, and at least one decorative element 6, positioned on a portion of the external surface of the film in plastic material 4, and made in at least one first material different from the film in plastic material 4.

It will be noted that the shape of the trim element of FIGS. 1 to 3 is only an exemplary embodiment which is by no means limiting and that any other shape may of course be contemplated.

The decorative element 6 is for example formed with a wood complex 8, comprising at least, from the outside to the inside, a layer of wooden material 10 and a reinforcement layer 12, extending on the underside of the wooden material layer 10 and forming the internal face of the decorative element 6. Optionally, the decorative element comprises a protective coating 13 covering the wooden material layer 10 over its upside, i.e. on the side of the external face of the wooden material layer 10.

The wooden material layer 10 is for example formed with a layer of natural wood or a superposition of wood layers. The wood material layer 10 is sufficiently thin so as to have some flexibility and thus able to be shaped three-dimensionally.

The reinforcement layer 12 directly extends over the underside of the wooden material layer 10 and is formed with a flexible material. By flexible is meant that the reinforcement layer 8 is not rigid and may be shaped.

The material of the reinforcement layer is for example a textile, such as a woven or non-woven or paper or cardboard or else even a plastic film.

The protective coating 13 has the function of protecting the wooden material layer 10, for example against ultraviolet radiations which may cause accelerated ageing of the wooden material layer 10. The protective coating 13 is for example a synthetic resin, such as a varnish, for example a varnish based on polyurethane or other polymer. The protective coating may be colored, translucent or transparent.

The wooden material layer 10 and the reinforcement layer 12 are assembled together, for example by adhesive bonding, and thus form a flexible complex 8 which may be shaped in order to form one portion of a trim element. The total thickness of the complex 8 is for example comprised between 0.3 mm and 3 mm. The protective coating 13 may be added onto the wooden material layer 10 for example by coating, before or after its assembly with the reinforcement layer 12 and does not substantially modify the mechanical characteristics of the obtained complex 8.

According to an embodiment, the complex 8 has a total thickness comprised between 0.7 and 0.8 mm and the wooden material layer has a thickness comprised between 0.3 and 0.4 mm.

Such a decorative element 6 gives the possibility of giving a "wooden" appearance to the trim element, while having a sufficiently malleable decorative element 6 in order to shape it at will.

The decorative element 6 may be of any suitable shape. In the finished trim element, the decorative element 6 may extend along three dimensions. The decorative element may notably have complex three-dimensional shapes. It may be continuous or comprise through-apertures 14, for allowing the passing of functional elements of the vehicle, for example when the trim element surrounds these functional elements, as this is the case for a dashboard, or for integrating patterns into the decorative element, for example by providing several apertures of small dimensions making a wooden material pattern.

It is understood that other types of decorative elements 6 may be provided, by using other materials or by only using natural wood, for example beadings in natural wood or in another material.

According to other examples, the decorative element may be formed by a leather element with a thickness comprised between 0.8 mm and 1.2 mm, by an aluminum element with a thickness comprised between 0.6 mm and 1 mm, a carbon element with a thickness comprised between 0.5 mm and 1 mm or a textile element comprised between 0.5 mm and 1 mm. Generally, decorative elements with a thickness comprised between 0.1 mm and 3 m may be used. Of course, several decorative elements in different materials may be provided.

Figure 6:
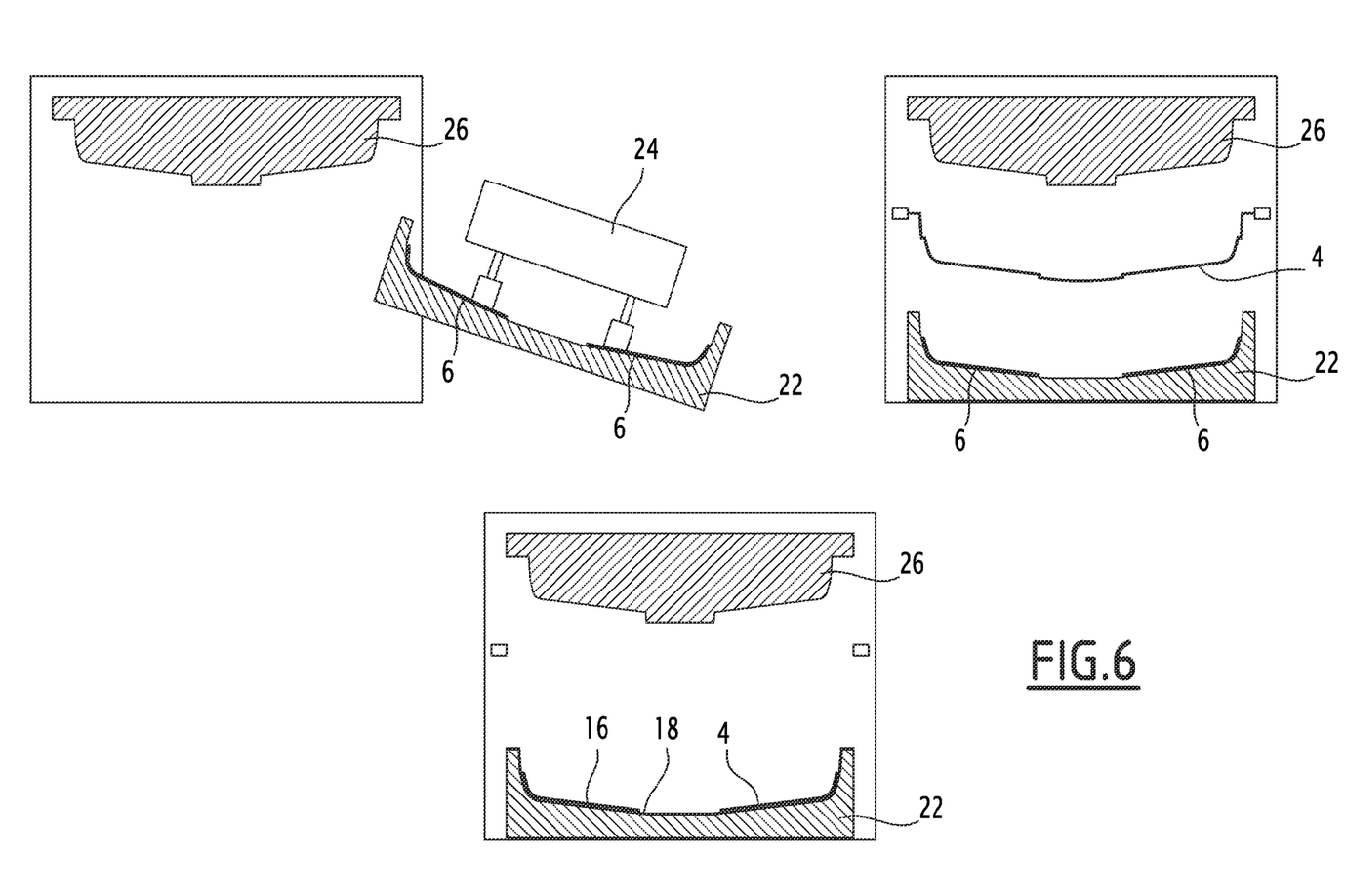
FIG. 6 is a schematic illustration of the different steps for assembling two decorative elements with the film in plastic material.
Figure 7:
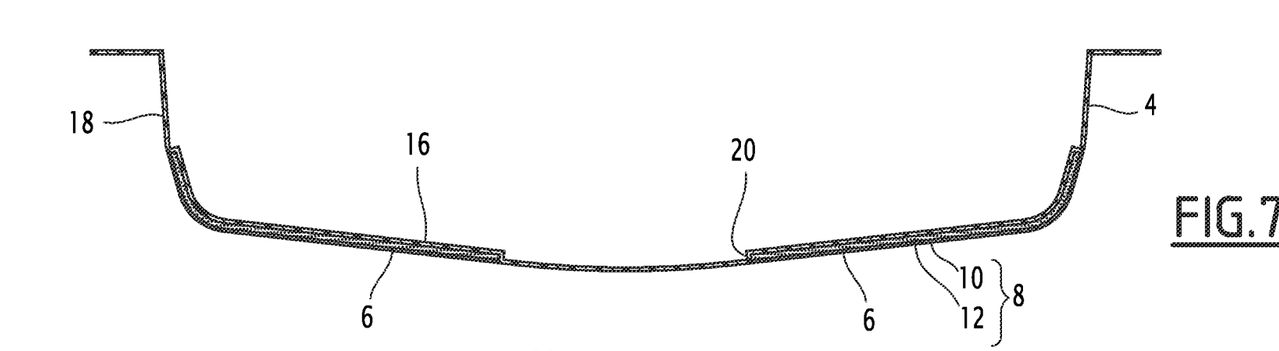
FIG. 7 is a schematic sectional view illustration of the decorative elements assembled with the plastic material film at the end of the steps illustrated in FIG. 6.
Figure 8:
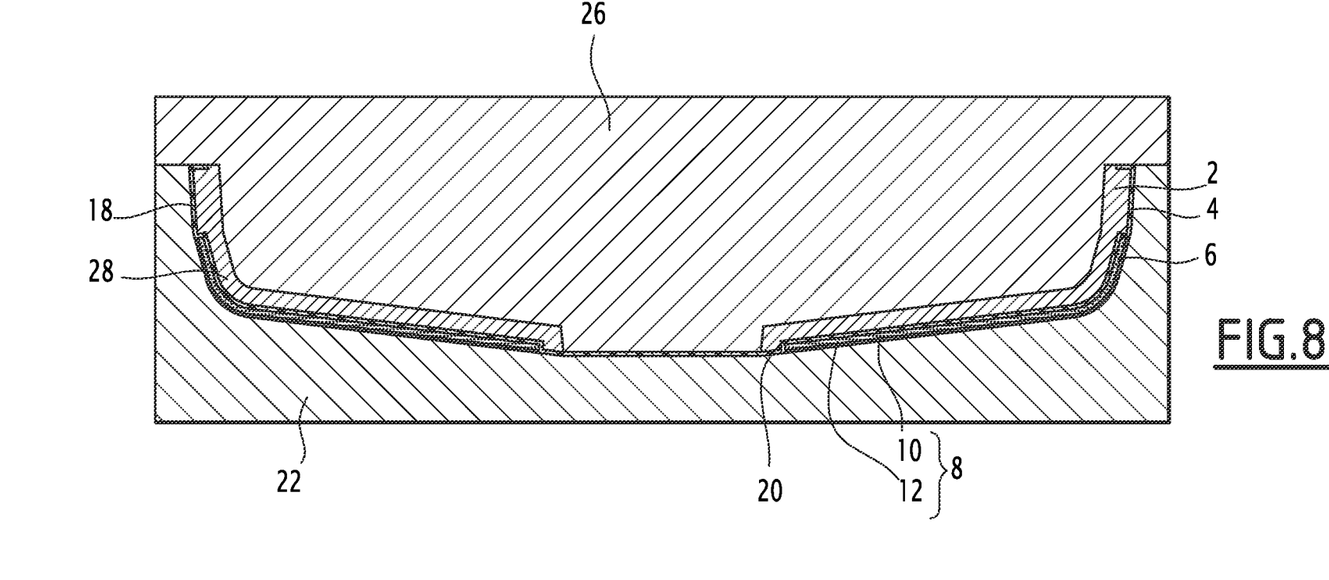
FIG. 8 is a schematic sectional illustration of the step for making the substrate on the assembly of FIG. 7.

According to the embodiment illustrated in FIGS. 6 to 8, the trim element 1 may comprise at least two decorative elements 6, as described above. These decorative elements 6 are distinct from each other, i.e. they form two separate parts added onto the trim element 1, and for example positioned in two different areas of the trim element 1 spaced apart from each other, the area between the decorative elements 6 not being covered with a decorative element 6.

The film in plastic material 4 extending over the underside of the decorative element 6 and at least partly covering the substrate 2 is for example made in polycarbonate (PC), acrylonitrile butadiene styrene (ABS), PC-ABS, polymethyl methacrylate (PMMA) or a mixture of these materials. More generally, the film 4 is made in a material different from the one of the decorative element 6. This film 4 is thin and has a thickness smaller than that of the decorative element 6. As an example, the film has a thickness comprised between 0.275 mm and 0.750 mm. Generally the thickness of the film is close to 0.275 mm.

The film 4 comprises an underside area 16, formed by the portion of the film 4 which extends over the underside of the decorative element 6, and at least one peripheral area 18, formed by a portion of the film 4 not covered by the decorative element 6.

The peripheral area 18 forms a portion of the visible face of the trim element 1, i.e. it extends on the outside of the trim element 1 and is visible from the outside of this trim element. The peripheral area 18 extends in the continuity of the decorative element 6, i.e. the visible face of the decorative element 6 and the visible face of the peripheral area 18 are flush and form a visible face of the continuous trim element 1. Thus, the peripheral area 18 and the underside area 16 are connected to each other through a projection 20, corresponding to the thickness of the decorative element 6, surrounding the periphery of the decorative element 6.

The peripheral area 18 may be used for forming an edge around the decorative element 6, as illustrated in FIGS. 2 and 3. Such an edge has a particular aesthetical aspect, which gives a satisfactory appearance, without any defect in appearance, to the transition between the decorative element 6 and the remainder of the trim element 1.

The peripheral area 18 may also form the edge of a through-aperture 14 in order to improve the appearance thereof, as illustrated in FIGS. 1 and 2.

Figure 4:
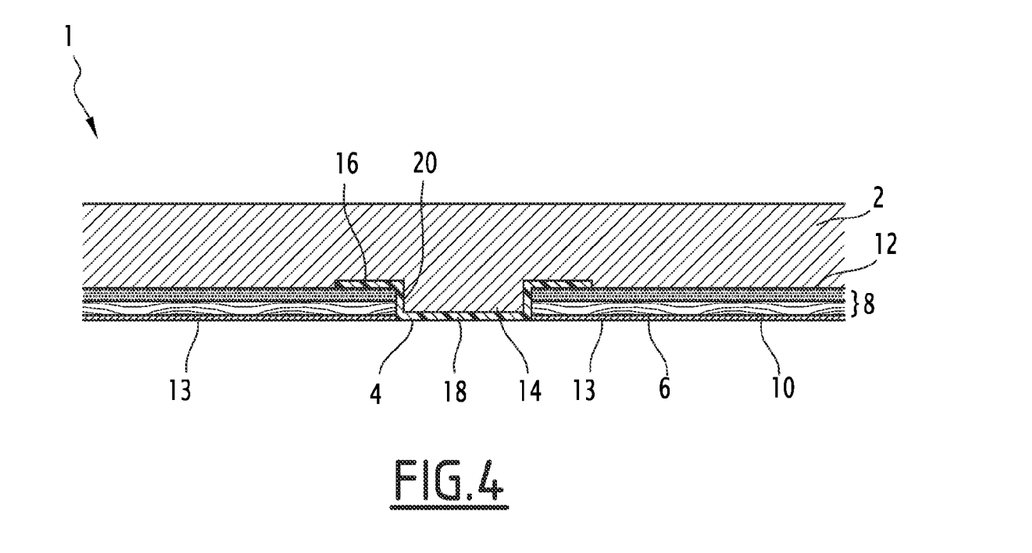
FIG. 4 is a schematic sectional view illustration of another example of a trim element according to the invention, wherein the decorative element comprises a through-aperture.

According to the embodiment illustrated in FIG. 4, the peripheral area 18 may extend in aperture 14 so as to obturate the latter. Such an embodiment is particularly advantageous when the aperture 14 is of a small size and is used for defining a pattern in the decorative element 6. A set of apertures in the decorative element 6 thus advantageously allows a pattern to be generated on the decorative element. The peripheral area 18 gives the possibility of avoiding the "jutting out" of the substrate 2 extending the aperture 14 from the side of the visible face of the trim element 1 by passing through the aperture(s) 14, as this will be described later on, and further allows improvement in the aesthetics of the pattern by highlighting its presence when a plastic material film having a particular appearance is selected, as this will now be described.

Indeed, at least the peripheral area 18 may be laid out for having a particular appearance giving the possibility of improving the appearance of the trim element 1, given that this peripheral area 18 is visible from the outside of the trim element 1. Thus, the peripheral area 18 is used, as a decorative element 6, in order to give a particular appearance to the trim element 1. For this purpose, the plastic material film 4 may be selected with a particular color. Alternatively or as a combination, the plastic material film 4 may undergo surface treatments, at least on the side of the external face of the peripheral area 18. By surface treatment, is meant a treatment aiming at modifying the appearance of the film in plastic material, such as a print on the visible face of the film, a chroming, varnishing, coloring operation or other operation. At least the peripheral area 18 may also undergo several different surface treatments in order to have a peripheral area 18 having a variable appearance depending on the area of the trim element in which it extends.

Advantageously, the plastic material film comprises a peripheral area 18 surrounding the whole periphery of the decorative element 6. However, having a peripheral area only surrounding a portion of the decorative element 6 may be contemplated.

In the case when the trim element 1 comprises several distinct decorative elements 6 spaced apart from each other, the plastic material film 4 then comprises two underside areas 16, each extending over the internal face of one of the decorative elements 6, and for example at least one peripheral area 18 extending from one of the decorative elements 6 to the other. This peripheral area 18 may form the visible face of the trim element 1 in the space extending between the decorative elements 6 or be removed after making the trim element in order to form an aperture between the decorative elements 6.

The substrate 2 is a conventional one for this kind of application. It is made in an injectable material in an injection tool. The substrate 2 is for example substantially rigid and gives the possibility of holding the decorative element 6 in shape and of stiffening the trim element 1.

The substrate 2 is for example made in a composite material comprising natural fibers embedded in a plastic material. Such a composite material is known under the name of NFC (natural fiber composite). The natural fibers are for example formed with wood or flax or other fibers. The plastic material fibers are for example polypropylene (PP) and/or polyethylene terephthalate (PET) fibers and are melted by coating the natural fibers in order to form a coherent assembly, in which the natural fibers are bound to each other by the plastic material. Alternatively, the substrate 2 may be a pure injectable plastic material for example, PC, PC-ABS, polyamide (PA), either reinforced or not with fibers notably with glass fibers.

With reference to FIGS. 5 to 8, a method for making a trim element 1 as described above is now described.

Figure 5:
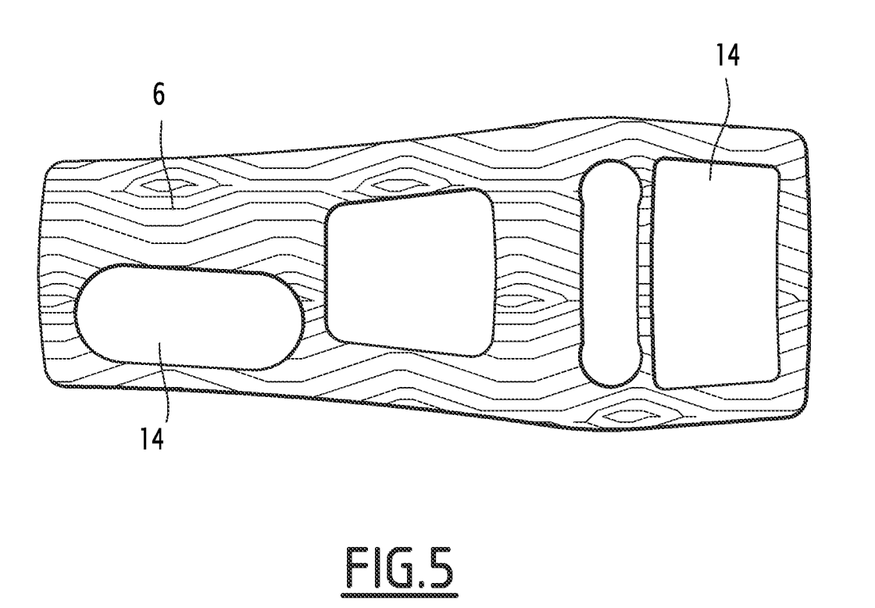
FIG. 5 is a schematic front illustration of a decorative element provided for making the trim element of FIG. 1.

During a first step, the decorative element 6 is formed by for example assembling the wooden material layer 10 to the reinforcement layer 12 so as to form the complex 8 and by cutting out this complex 8 according to the intended contour, as illustrated in FIG. 5. This cutting-out step is for example achieved with a laser on a substantially planar complex 8, i.e. before its subsequent three-dimensional shaping. The cutting out with the laser 8 gives the possibility of obtaining a very accurate cut-out of the decorative element 6, notably for the shape and the position of the through-apertures 14. Such cutting out with a laser also allows formation of apertures of small dimensions with which finely cut-out patterns may be obtained in the decorative element 6.

During a second step, the decorative element 6 is placed in a first portion 22 of a forming tool, for example by means of a manipulator 24 capable of picking up a decorative element 6 and of positioning it in the first portion 22 of the forming tool (diagram on the left of FIG. 6). The first portion 22 may for example be mobile so as to be placed facing an operator maneuvering the manipulator 24 during the loading and unloading of the decorative element and in order to be positioned under a second portion 26 of the tool during operation of the forming tool. According to the embodiment illustrated in FIG. 6, two decorative elements 6 are simultaneously placed against the first portion 22 of the forming tool. The external face of the decorative element 6 is applied against the wall of the first portion 22 so that the internal face of the decorative element 6 is turned towards the second portion 26 of the tool. Next, the first portion 22 is replaced under the second portion 26 of the tool and the film in plastic material 4, shaped beforehand for example by thermoforming, is interposed between these portions (diagram on the right of FIG. 6). The second portion 26 is then brought closer to the second portion 22 so as to apply the film 4 against the underside, or internal face, of the decorative element 6 and to assemble, for example by thermocompression or by adhesive bonding, the decorative element 6 on the external face of the plastic material film (figure at the bottom of FIG. 6 and FIG. 7). During this assembling step, the decorative element 6 and the plastic material film 4 are also shaped so as to substantially obtain the three-dimensional shape which they will have on the finished trim element 1.

According to an embodiment, the film 4 is directly thermoformed on the decorative element 6, the internal face of which has been sized beforehand with an adhesive which may be reactivated by heating for example. Such a method is for example described in document WO2011089359. This method advantageously gives the possibility of obtaining a superior finish in the connecting area between the decorative element 6 and the film 4.

The decorative elements 6/film 4 assembly is then positioned in an injection cavity 28 (FIG. 8) by placing the visible face of the decorative elements 6 and the visible face of the peripheral area 18 of the film 6 against a wall of this cavity, having the shape of the trim element 1 to be obtained. The substrate 2 is injected into the injection cavity on the underside or internal face of the film in plastic material 4, i.e. on the face of the film opposite to the underside area 16 and to the peripheral area 18.

It will be noted that the injection cavity 28 may be formed by the forming tool used for assembling the decorative element 6 to the film in plastic material 4 simply by adjusting the distance separating the first portion 22 from the second portion 26 of the tool so as to leave a space to be filled with the injection material forming the substrate 2.

The film in plastic material 4 gives the possibility of holding the decorative element 6 in the injection cavity 28 without risking any poor positioning of these elements relatively to each other and relatively to the substrate 2. Indeed, the plastic material film 4 "sets" the position of the decorative element 6 on the wall of the injection cavity once it is applied against these decorative elements 6. Further, the plastic material film 4 avoids infiltration of the injection material forming the substrate 2 into the through-apertures 14 and especially prevents this material from passing onto the side of the visible face of the trim element 1.

Leaving a portion of the plastic material film beyond a peripheral area 18 surrounding a decorative element 6 may be contemplated; this excess portion may be used as a means for holding the decorative element 6/film 4 assembly in an injection cavity and may be cut out before injecting the material forming the substrate.

The trim element 1 described above is reproducible like the original without any risk of a difference in position of the decorative element 6 from one thin element to the next. Furthermore, the edge of the decorative element 6 may have a favorable appearance by the peripheral area 18 of the plastic material film. This film facilitates the making of the trim element, notably when it comprises several decorative elements 6.

The peripheral area 18 further gives the possibility of masking possible defects in appearance in the substrate 2 (for example re-sticking lines) and/or using less noble materials for making the substrate, since the latter is protected by the peripheral area of the film and is therefore not subject to scratches, UV radiation, etc. Furthermore, the appearance of the substrate 2 does not have to be particularly aesthetical, even in these visible areas of the substrate, since the outside appearance of the trim element in the areas is given by the peripheral area 18 of the film 4. Thus, materials (for example ABS) not giving the possibility of normally having a satisfactory appearance may be used for forming the substrate 2.

The method according to the invention allows formation of the trim elements having complex shapes, for example comprising recessed and/or raised portions, having edges with local stretching of more than 5%. In this case, the areas having significant stretching may be covered with a film 4, while the suitable areas are covered with one or several decorative elements 6. Conventional methods do not give the possibility of obtaining this type of coated parts with one or several decorative elements as described above.

Because of the natural materials used for the decorative elements and the three-dimensional shapes of these elements, the thickness of these elements is greater than that of the film 4. By using such a film, it is possible to provide decorative elements having thicknesses greater than those of simple thermoformed decorative elements and to increase the possibilities in the selection of the three-dimensional shapes of the decorative elements, which may be made more complex, and for example have raised and recessed or other portions. As indicated above, the presence of film gives the possibility of facilitating the positioning and the holding of the decorative elements during the making of the trim elements and of avoiding steps for reworking the obtained part, such as cutting out or other steps.

The invention claimed is:

1. A vehicle trim element comprising at least one decorative element made in a first material, said decorative element comprising an external face forming a portion of a visible face of the trim element and an internal face, said decorative element being laid out on a film in plastic material, different from the first material, said film comprising at least one underside area extending over the internal face of the decorative element, said film being laid out at least partly on a substrate, the film further comprising at least one peripheral area extending around at least one portion of the decorative element and forming another portion of the visible face of the trim element, wherein the decorative element comprises at least one aperture through said decorative element, a peripheral area of the film extending in said aperture and forming the visible face of the trim element in said aperture.

2. The trim element according to claim 1, wherein the decorative element is formed with a wood complex, comprising at least one wood material layer and a reinforcement layer, said reinforcement layer extending over the underside of the wood material layer and forming the internal face of the decorative element.

3. The trim element according to claim 1 wherein the peripheral area of the film substantially extends in the continuity of the external face of the decorative element.

4. The trim element according to claim 1 wherein the trim element comprises at least two distinct decorative elements spaced apart from each other, the film comprising two underside areas, each extending over the whole internal face of one of the decorative elements, and at least one peripheral area extending from one decorative element to the other and forming the visible face of the trim element between said decorative elements.

5. The trim element according to claim 1 wherein at least the peripheral portion of the film is subjected to a surface treatment so as to modify its appearance.

6. A method for making a trim element according to claim 1, said method comprising the following steps:
   placing at least one decorative element on a wall of a forming tool, the external face of said element being applied against said wall,
   applying the underside area of the film in plastic material onto the whole internal face of the decorative element and the peripheral area against the wall of the forming tool so that said area at least surrounds one portion of the decorative element, said film being attached to the decorative element during this operation,
   forming the substrate on an internal face of the film in plastic material, on the face of said film opposite to the underside area and to the peripheral area.

7. The manufacturing method according to claim 6, wherein at least two decorative elements are placed on the wall of the forming tool spaced out from each other, the film being applied on the internal faces of said two decorative elements and the peripheral area of said film being applied against said wall at least between said decorative elements.

8. The manufacturing method according to claim 6, wherein, after the applying step, the decorative element and plastic material film are placed together in an injection tool, and the substrate is injected onto said film in said injection tool.

9. A vehicle trim element comprising at least one decorative element made in a first material, said decorative element comprising an external face forming a portion of a visible face of the trim element and an internal face, said decorative element being laid out on a film in plastic material, different from the first material, said film comprising at least one underside area extending over the internal face of the decorative element, said film being laid out at least partly on a substrate, the film further comprising at least one peripheral area extending around at least one portion of the decorative element and forming another portion of the visible face of the trim element, the decorative element comprising at least one aperture through said element, a peripheral area of the film extending in said aperture and forming the visible face of the trim element in said aperture, wherein the peripheral area of the film extending in the aperture obturates said aperture or only covers the edges of said aperture.

10. The trim element according to claim 9, wherein the decorative element is formed with a wood complex, comprising at least one wood material layer and a reinforcement layer, said reinforcement layer extending over the underside of the wood material layer and forming the internal face of the decorative element.

11. The trim element according to claim 9, wherein the peripheral area of the film substantially extends in the continuity of the external face of the decorative element.

12. The trim element according to claim 9, wherein the trim element comprises at least two distinct decorative elements spaced apart from each other, the film comprising two underside areas, each extending over the whole internal face of one of the decorative elements, and at least one peripheral area extending from one decorative element to the other and forming the visible face of the trim element between said decorative elements.

13. The trim element according to claim 9, wherein at least the peripheral portion of the film is subjected to a surface treatment so as to modify its appearance.

14. A method for making a trim element according to claim 9, said method comprising the following steps:
placing at least one decorative element on a wall of a forming tool, the external face of said element being applied against said wall,
applying the underside area of the film in plastic material onto the whole internal face of the decorative element and the peripheral area against the wall of the forming tool so that said area at least surrounds one portion of the decorative element, said film being attached to the decorative element during this operation,
forming the substrate on an internal face of the film in plastic material, on the face of said film opposite to the underside area and to the peripheral area.

15. The manufacturing method according to claim 14, wherein at least two decorative elements are placed on the wall of the forming tool spaced out from each other, the film being applied on the internal faces of said two decorative elements and the peripheral area of said film being applied against said wall at least between said decorative elements.

16. The manufacturing method according to claim 14, wherein, after the applying step, the decorative element and plastic material film are placed together in an injection tool, and the substrate is injected onto said film in said injection tool.

* * * * *